Figure 2:
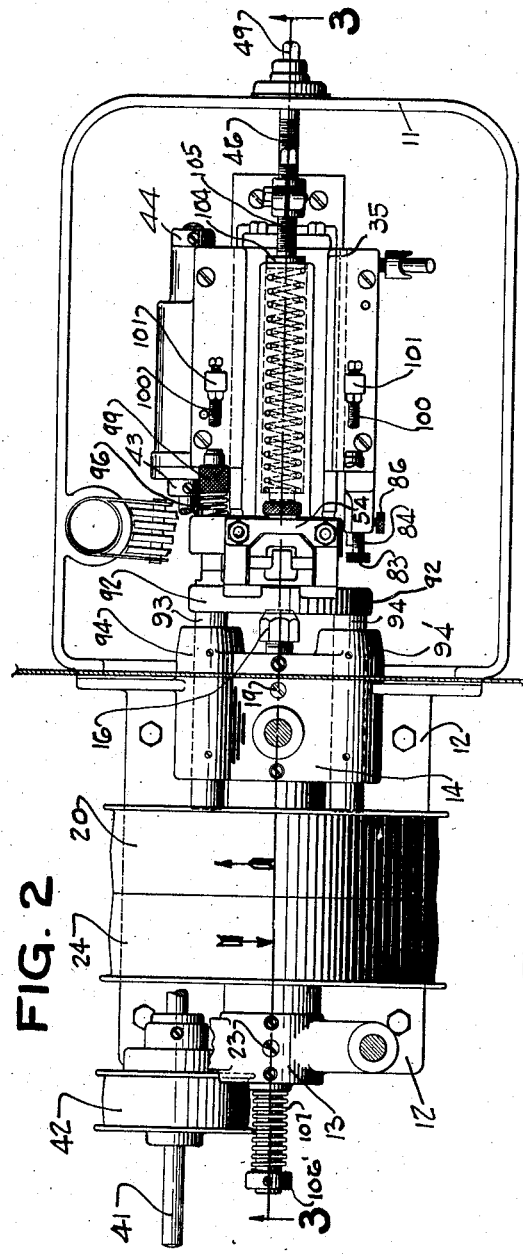

Feb. 4, 1930.  G. A. VIS  1,745,778
NUT TAPPING MACHINE
Filed June 1, 1925   3 Sheets-Sheet 1

INVENTOR.
GEORGE A. VIS.
BY John P. Tarbox
ATTORNEY.

Feb. 4, 1930. G. A. VIS 1,745,778
NUT TAPPING MACHINE
Filed June 1, 1925 3 Sheets-Sheet 2
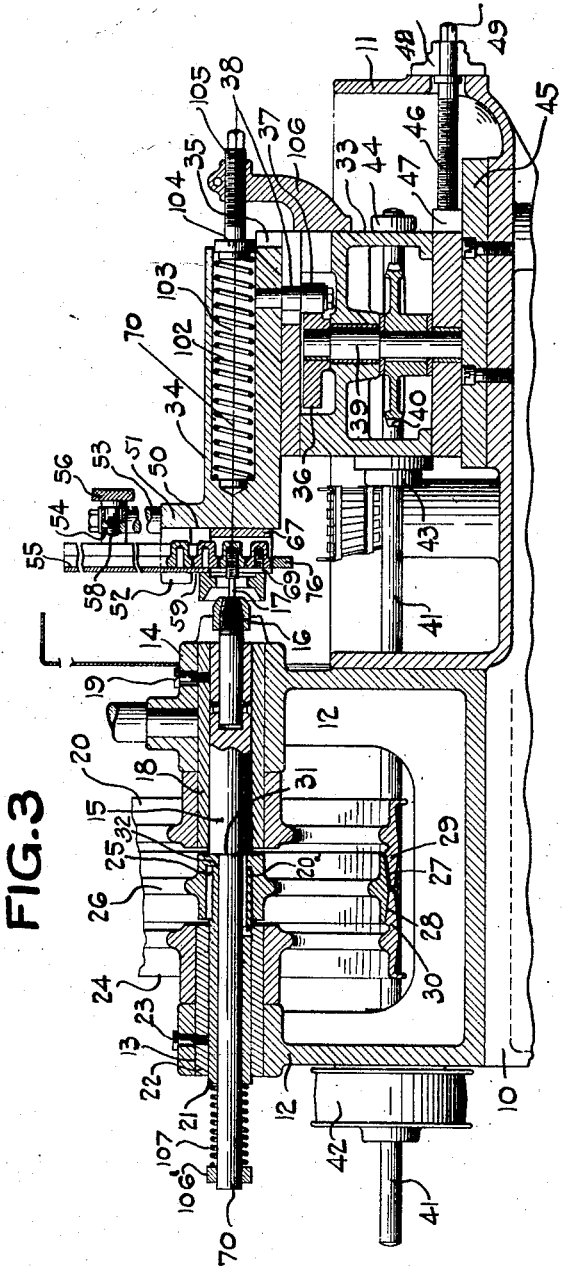
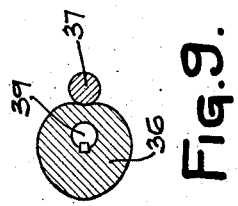
INVENTOR.
GEORGE A. VIS.
BY John P. Tarbox
ATTORNEY.

Feb. 4, 1930.        G. A. VIS        1,745,778
NUT TAPPING MACHINE
Filed June 1, 1925        3 Sheets-Sheet 3

INVENTOR.
GEORGE A. VIS.
BY
John P. Tarbox
ATTORNEY.

Patented Feb. 4, 1930

1,745,778

UNITED STATES PATENT OFFICE

GEORGE A. VIS, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

NUT-TAPPING MACHINE

Application filed June 1, 1925. Serial No. 34,210.

My invention has a number of objects foremost among which are the production of an automatic machine capable of a very high speed of production, the attainment of the very highest accuracy, the tapping of conical or ball headed nuts with the same facility and accuracy with which nuts having square heads may be tapped, the elimination of tap and machine breakage, and the resultant elimination of tie ups in the operation of the machine which cut down the rate of production based upon the maximum speed of which the machine is capable. Other and subordinate objects will appear from an understanding of the invention.

In the main I attain the objects of my invention through the effective combination of a nut feeding mechanism of the magazine type, and a nut aligning mechanism. The coaction between these elements and the remaining elements of the machine, is such that extreme accuracy may be obtained without sacrifice of speed and without endangering the breakage of the parts. More specifically speaking, I mount the tap on a relatively fixed axis, and float the nut magazine and the nut holding devices before this fixed axis in such manner that the aligning means has an open range within which to act. This aligning mechanism is aligned axially with respect to those fixed parts by means of which the tap is axially fixed in position, whereby a nut once aligned is possessed of identically the same axial position as the tap itself. These and other objects are attained by resiliently or yieldingly deriving all of the torques and thrusts incident to the movements of the machine whereby when under resistance from any source, the parts yield and do not break or malform the threads being made. More specifically this means embodies a coaction of resilient devices through which the nuts are fed onto the tap, and resilient devices through which the tap is backed off through the threaded nut.

Much of the apparatus has been intended but to carry out a method of my invention, the nature of which will be the more fully apprehended upon the understanding of the apparatus. Suffice it to say at this juncture that the method involves the floating of a nut being fed before the tap, its alignment with the tap by floating it into the coincident axial position, and its final release as controlled by the depth of the tapping itself. From this last step in the method, there results the great advantage of assurance of uniform and sufficient depth of tapping in those classes of nuts commonly called "cap" nuts. More specifically speaking, the method as applied to the manufacture of spherically or conically faced cap nuts consists in forming on the nut a spherical or conical face, and an aligning shoulder in a plane truly transverse to the axis on which it is desired to tap the nut, floating the nut into position to be aligned, aligning it by bringing its spherical or conical face to center upon the tapping axis, and bringing its transversely plane aligning shoulder at right angles to the axis of tapping, yieldingly tapping the nut in such position, and releasing the nut from the tap after each tapping operation irrespective of depth, but retaining it in releasing position subject to its having been tapped to the depth desired. Other steps of the method bound up in the apparatus will be apprehended upon the full understanding of the invention.

Of the drawings:—

Figure 1:
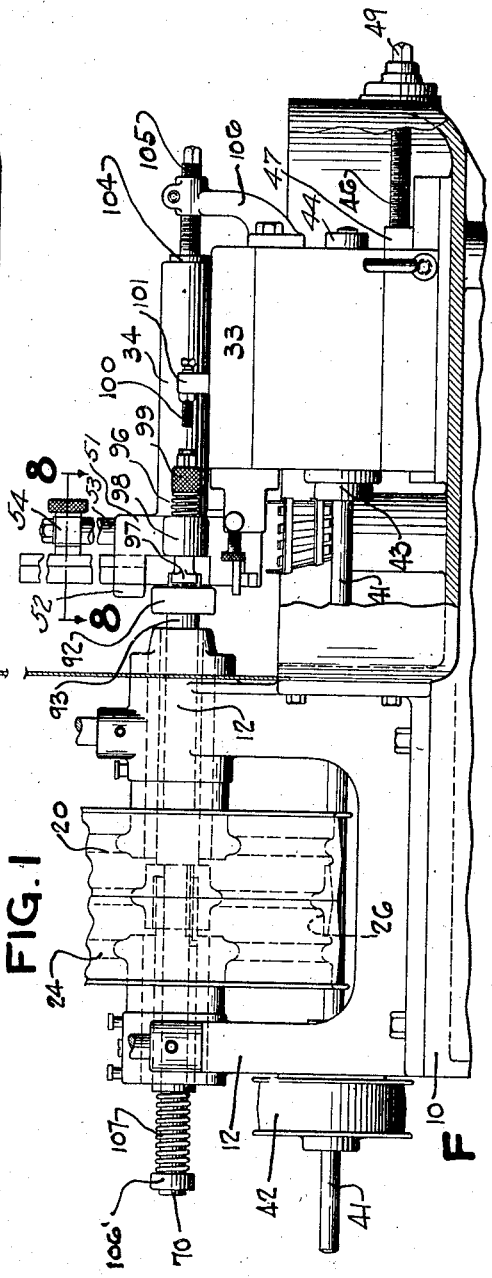
Figure 6:
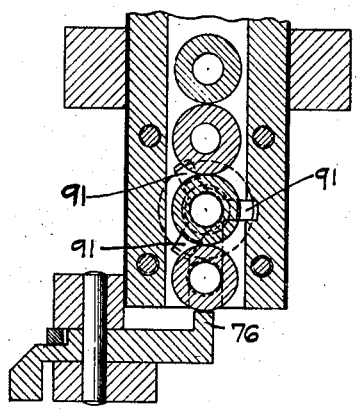
Figure 4:
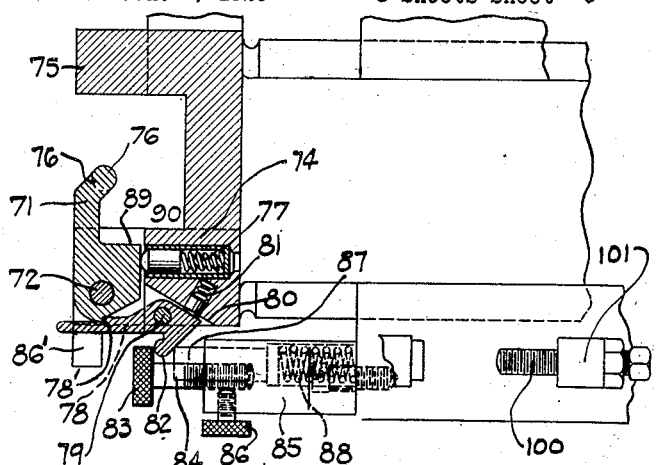
Figure 8:
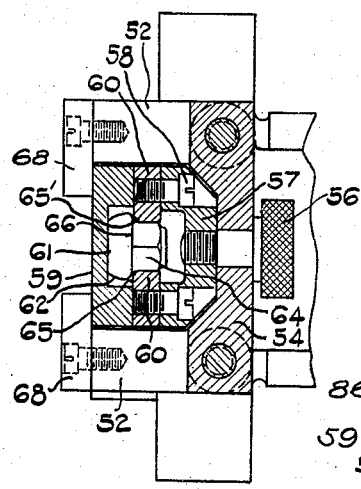
Figure 5:
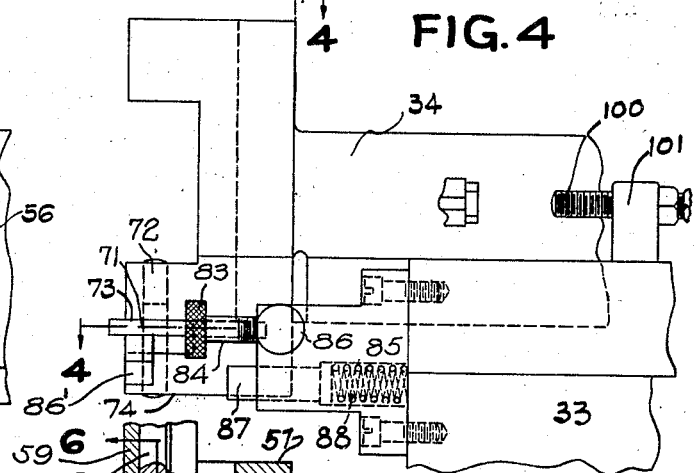
Figure 7:
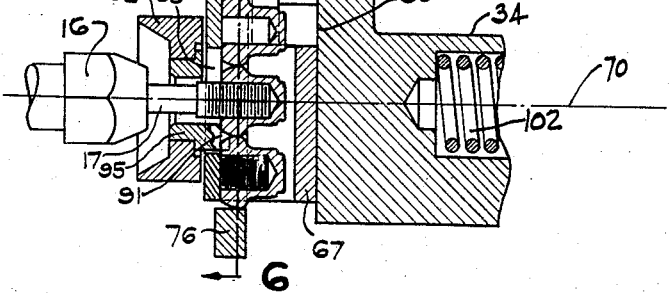

Fig. 1 is a side elevation of the machine;
Fig. 2 is a top plan view;
Fig. 3 is a longitudinal vertical section;
Fig. 4 is a horizontal section substantially on line 4—4 of Fig. 5;
Fig. 5 is an elevation of the portion of the mechanism shown in Fig. 4;
Fig. 6 is a transverse vertical elevation substantially on line 6—6 of Fig. 7;
Fig. 7 is a longitudinal vertical sectional elevation of the same portion of the machine shown in transverse section in Fig. 6;
Fig. 8 is a transverse section taken substantially on line 8—8 of Fig. 1;
Fig. 9 is a plan view of the cam and cam follower.

The machine is built on a base frame 10, adapted by means not shown to be stood upright upon the floor or other foundation. At its front end it carries in an elevated position, a trough structure 11 adapted to serve as a reservoir for the oil or other fluid with which the tap and nuts are flooded during the operation of the machine. The rear end of the base behind this trough is shouldered and has bolted thereto a driving mechanism pedestal frame 12 substantially of U form.

Longitudinally extending bearings 13 and 14 in the upper ends of the opposite branches of the U support the main spindle 15 of the machine through the intermediary of a series of sleeves presently to be described. In the outer end of this main spindle 15, there is socketed a tap chuck 16, adapted to hold in true axial alignment the tap 17. This chuck may be of any one of the number of types admitting a ready removal of the tap. This end of the spindle is journaled in the sleeve 18 which is held against rotation in the bearing 14 by means of a screw 19 passing through the body of the bearing and has its rear end projected beyond the bearing. Upon its rear end is journaled a driving pulley 20 having the direction of motion indicated by the arrow in Fig. 2, the opposite end of spindle 15 being splined at 20$^a$ to a sleeve 21 which rotates with the spindle. Sleeve 21, in turn, is rotatably journaled in a sleeve 22 which like the sleeve 18, is fitted into the bearing 13 and held against rotation therein by the screw 23. The front end of sleeve 22 is extended forwardly of bearing 13. Rotatably journaled on the extension is another driving pulley 24 rotated continuously by a belt (not shown) in the direction opposite to the rotation of the pulley 20 as shown by the arrow in Fig. 2. Pulleys 20 and 24 may be driven by any suitable motor located above the machine, or carried by the machine in a suitable location as for example within the lower part of the base 10. The forward end of sleeve 21 is also projected forwardly and beyond the forward end of the sleeve 22, but not as far as the adjacent end of the sleeve 18. Keyed by means 25 to the end of sleeve 21 is an inner cone clutch pulley 26. Member 26 is provided on its periphery with conical clutch surfaces 27 and 28. Driving pulleys 20 and 24 are provided on the inner sides of their rims with complemental clutch surfaces 29 and 30 respectively. The arrangement is such that if the clutch member 26 is projected rearwardly of the machine, which is to say to the left, clutch surfaces 28 and 30 are engaged frictionally with the result that the spindle 15 and tap 17 are driven righthandedly looking toward the tap, and when member 26 is moved forwardly, surfaces 27 and 29 are engaged to move the tap lefthandedly. Member 26 is shifted from one position to the other by shifting the spindle 15. To facilitate this the spindle is provided with a shoulder 31 engaging the hub face of one shiftable member 26, and the sleeve 21 on the opposite end of the spindle is provided, in turn, with an end shoulder 32 engaging an opposite hub face of the member 26. Thereby when spindle 15 is engaged by its forward end and pushed rearwardly, member 26 engages the clutch for righthanded motion, whereas if the spindle is drawn forwardly by its front end and sleeve 21 moves with it, shoulder 32 shifts clutch member 26 forwardly to drive the tap lefthandedly. The means by which the spindle moves sleeve 21 will presently be described.

Arranged within the body of trough 11 on a pedestal 33, bolted to its bottom is the nut feeding mechanism. This comprises a longitudinally reciprocating sliding head 34, having a dove-tailed connection 35 with the pedestal 33 in the horizontal plane. This head is continuously reciprocated by means of a cam 36, housed in the body of pedestal 33, and engaging a cam follower 37 connected by pin 38 with the head 34. The cam and its follower are shown more or less diagrammatically in the plan in Fig. 9. Cam 36 is mounted upon a vertically extending cam shaft 39, rotated by a worm gear 40, driven from the longitudinally extending side shaft 41, borne in suitable bearings on the side of the machine and deriving its power through a belted connection (not shown) to the driving pulley 42. This shaft has a splined connection with driving pulley 42 (not shown) whereby it may be drawn longitudinally through its driving pulley 42 which pulley is fixed in position with respect to the pedestal 12 in any suitable manner, as for example, by retaining collars. At its front end shaft 41 is fixed against axial movement with respect to pedestal 33 upon which it is borne by means of collars 43 and 44 on the outward ends of its bearings. The entire pedestal 33 is slidably mounted on the dove tailing bed plate 45 by means of which it is bolted down to the bottom of the trough. A screw 46 threaded into the base of pedestal 33 at 47 and having a swiveled connection 48 with the side of trough 11 is provided with a squared head 49 by means of which the screw may be turned, and the pedestal 33 and all the mechanisms connected therewith are withdrawn forwardly to permit full and free access to the tap 17 and the chuck 16.

On its rear end, the head 34 is provided with a vertically extending feeding face 50 and an upwardly extending projection 51 having radially spaced forked arms 52 projecting inwardly. Secured to this head and projecting and extending vertically in transverse spaced relation, are a pair of columns 53 which support at their upper ends between them a bridge member 54. A vertically extending nut magazine 55 is swivelly supported from this bridge by means of the centrally located swivel screw 56 which is provided with a knurled head, a shouldered shank passing through the body of the bridge, and a threaded end entering a bracket 57 in turn secured by machine screws 58 to the body of the magazine 55. So the magazine 55 is suspended from the screw 56, and in the region of the tap 17 may move laterally across the axis of the machine a degree dependent upon the difference between its width and the distance between the inner faces of the forked arms 52. This magazine 55 is a composite structure, comprising a main body plate 59 and two hardened steel aligning rails 60 bolted or screwed to the inner face thereof. Body plate 59 has its inner face slotted as at 61 (Fig. 8) to a depth substantially equal to the depth of spherical or conical face 62 of the nut to be tapped, and the width substantially greater than the diameter of its face. The guide rails 60 overhang the borders of the slot symmetrically with respect to the plane of symmetry of the machine (indicated by the line 3—3 of Fig. 2) and are spaced apart a distance substantially equal to the dimension across flats 64 of the heads of the nuts. Thereby nuts slide into the magazine from the top, slide downwardly with their fore ends substantially in contact with the bottom wall of the slot and with diametrically opposite flats 64 in contact with the guide rails 60. These guide rails are accurately dimensioned and aligned. The rails bearing by their edges on the flats bear also by their sides 65 upon the transversely plane shoulder 66 formed on the nut between the spherical or conical face 62 and the flatted head 64. If the nut shoulder 66 be borne forcibly against the accurately machined faces 65, the nut will be positioned with its axis parallel to the axis of the tap 17, since the faces 65 are positioned in a plane truly at right angles to the axis of tap 17. The lower end of the magazine 55 is provided with a bracket 67 (Figs. 3 and 7) secured to the body of the magazine as is the bracket 57. Both brackets 57 and 67 have their outer faces machined parallel to each other and to the faces 65 of guide rails 60, and they bear against the similarly machined face of supporting bridge 54 and face 50 of the head 34, the relative dimensions being such that the truly transverse plane of the aligning faces 65 is assured. At its lower end, the magazine is retained against axial displacement from its transversely aligned position by overhanging retaining blocks 68 removably secured to the outer ends of the forks 52. At the lower end the magazine 55 has its body 59 provided with an opening 69 of substantially circular shape surrounding the axis 70 of the machine, as shown clearly in Figs. 6 and 7. Through this opening, tap 17 may be projected to engage and operate upon a nut held within the magazine.

The nuts are prevented from falling from the bottom of the magazine and are successively released by trigger mechanism embodying that group of elements shown in Figs. 4 and 5. 71 is a horizontally extending trigger carried on a pivot pin 72 in a slot 73 in the left one 74 (the right hand from the front) of two downward extensions 74 and 75 from the head 34. This trigger is provided with a head 76 adapted to be positioned in vertical alignment with the spherical or conical faces 62 of the series of nuts in the magazine 55 and through its engagement with the face of the lowermost nut as shown in Figs. 3, 6 and 7 to retain the entire series of nuts from being drawn by gravity through the open lower end of the carrier or magazine 55. Trigger 71 is biased outwardly of this position by means of spring 77 engaging on that side of its pivot 72 toward the head 76. But it is normally retained with the head in its retaining position by means of the sear 78, the shoulder 78' of which engages a coacting shoulder on that end of the trigger on the opposite side of pivot 72. Sear 78 is mounted on pin 79 in a slot 80 in the extension 74 and has its front end projected past the shouldered end of the trigger 71 whereby it prevents the sear from being moved inwardly past the shouldered end under the bias of its retaining spring 81 which, like the spring 77, is socketed in the extension 74. At its inner end, the sear is provided with a lateral projection 82 in the path of movement of the under side of the head 83 of an adjustable tripping screw 84, threaded into the fixed side 85 of the pedestal 33. A set screw 86 serves to hold the tripping screw 84 in adjusted position. Whenever the head 34 is moved rearwardly a sufficient extent to engage the head 83 with the arm 82 of the sear 78, the trigger is released and the retaining head 76 removed from the path of the nuts in the carrier and the lowermost nut at least may drop out. It will be observed that the release is effected substantially instantaneously, in such small fraction of time that gravity accelerates all portions of the nut to equal degree and it falls freely from the lower end of the magazine. Those other than the lowermost nuts are prevented from dropping out because the tap 17 when the head 34 is moved inwardly, is engaged with the second nut of the series from the bottom. When the head 34 is moved outwardly, the tap is withdrawn from the nut which it engages, but before the complete withdrawal, the trigger 71 is reset upon the sear 78 by the engagement of its outer end 86' with a resetting pin 87 socketed in the side 85 of the pedestal 33 below the tripping screw 84 and yieldingly projected without its socket by a socketed spiral spring 88. Thereby, when the tap 17 is completely withdrawn from the nut operated upon, that nut drops to the vacated lowermost position as defined by the head 76 of the trigger and the remaining nuts of the magazine follow it, whereupon the next succeeding nut takes the place to be operated upon, in the axis of the machine. In the event there is any overthrow on the rearward movement of the head 34 after the trigger 76 has been set, that overthrow is taken by the yielding resetting pin 87, movement of the head 76 beyond its proper retaining position in line with the spherical faces 62 of the nuts being prevented by the engagement of the trigger body at 89 with the abutting wall 90 of the recess 73 in which it is mounted.

The nut being operated upon is accurately aligned by the engagement with its spherical or conical face 62 of the three concentrically arranged fingers 91 of the clamping and aligning head 92. This head surrounds the tap 17 and is supported in the position between the chuck 16 and the lower end of the magazine 55 by means of aligning rods 93 and 94 borne in ways 94' in the front of the pedestal 12 parallel to the axis 70 of the machine in such manner as to present the fingers 91 on a circle concentric to the axis. The fingers 91 are formed on a hardened steel bushing 95 inset in the center of the head 92. Their engaging ends are formed as portions of a true cone having its axis coincident with the axis 70 of the machine and an inclination such that the engaging surface is tangent to the spherical or conical head 62 on a circle of contact intermediate the front and rear borders of the zone of the spherical or conical face 62. Thereby, when the aligning head 92 and the feeding head 34 approach each other, this aligning engagement is effected by the three fingers 91 and not only is the center of the spherical face 62 immediately placed upon the axis 70 of the machine, but under further pressure the shoulder 66 is brought to bear against the truly transverse aligning faces 65 of the rails of the magazine and the axis of the nut is coincided with the axis 70 of the machine which is the same as the axis of the tap 17. As long as the parts are pressed together in this relation the alignment is effectively maintained. And this is true of the torque on the nut imposed by the operation of the tap since the aligning forces are concentrically applied and the nut is prevented from rotating by the engagement of rails 60 with the flats 64.

The aligning and clamping head 92 is normally yieldingly held in its aligning and clamping position shown particularly in Fig. 1 by means of the springs 96 which exert the pressure on the head through pins 97, passed through ears 98 on the sides of the head 34 and confined between the ears and the adjusting nuts 99 by means of which the clamping and aligning tension may be adjusted. Head 92 is retained in this position throughout the movement of the head 34 except at the end of the back stroke when the tap 17 has been entirely released from the nut being operated upon. At this time the rear ends of pins 97 are engaged by the front ends of adjustable dogs 100 in the form of bolts threaded through upstanding lugs 101 on the fixed pedestal 33 of the machine. Through the adjustment of these dogs, the time of release of the clamping and aligning mechanism may be adjusted. Until this is released, the nut, even though it be released from tap 17, may not drop to the lowermost position in contact with trigger 76.

The head 34 is itself yieldingly moved inwardly by means of spiral spring 102 arranged within a socket 103 disposed on the axis 70 of the machine. Through engagement of the outer end of this spring with the head 104 of an adjusting screw 105 threaded into an upstanding arm 106 secured to the outer side of the pedestal 33, the spring pressure may be adjusted. The cam 36 of the form and arrangement shown in Fig. 9 moves the head positively on the outward stroke only merely permitting its inward movement as impelled by the spring 102, and the nut to be operated upon is presented yieldingly to the tap. So the outward and rearward end thrust on spindle 15 by means of which the spindle 15 is clutched to driving pulley 24 to furnish the power for the tap to do its work, is a yielding thrust which permits the tap to make its entry at a rate of speed dependent upon the effectiveness of its bite when it enters and subsequently at the rate of speed imposed by the pitch of the threads it cuts. Moreover, if undue resistance is encountered, the friction of clutch surfaces 28—30 of the clutch slip under the yielding pressure of spring 107 and the parts are not displaced, distorted or broken.

On the outward stroke of head 34, the tap, whether or not it has reached the bottom of the nut under this yielding application of power, is drawn outward with the head 34. On the rear end of spindle 15, is fixed a collar 106' which confines between itself and the outer end of the sleeve 21, a spring 107. This spring is compressed when the shaft is drawn outwardly and yieldingly presses sleeve 21 and with it the clutch member 26 out of engagement with the clutch pulley 24. Following further under the yielding pressure, clutch member 26 effects engagement with the oppositely rotative pulley 20 through surfaces 27 and 29 whereupon the reverse rotation of tap 17 is instituted and the tap is withdrawn from the nut being operated upon with the withdrawal of the head 34. It is withdrawn at a rate of speed governed entirely by the pitch of the threads which it cuts and any resistance which it may encounter, since the clutch surfaces 27—29 are borne together yieldingly under the pressure of spring 107. Thereby maladjustments or discrepancies in dimension and any other causes may not damage the machine or the work in the withdrawal operation.

Depending upon whether or not the tap has reached the depth which it is required to reach, the nut being operated upon is released to give place to another, or is repeatedly operated upon until that nut is tapped to the desired depth. This part of my process is carried out by the apparatus through adjustment of the tripping screw 83 so that it can engage and release the sear 78 only when the head 34 has been moved under the yielding pressure of spring 102 inwardly a sufficient distance to reach the tap 17 to the precise depth desired. When so set, not until that depth is reached will the sear be tripped. That depth can only be reached in case the tap has not encountered any unusual resistance due to the quality of the material in the nut, to the dulling of the tap, to the presence of chips, or to any other cause. As long as there is sufficient opposition to the tap to prevent it reaching its full depth, the tapping operation is repeated and through repetition ultimately finds its depth. Immediately the sear 78 is released, the lowermost nut, while the nut being operated upon is yet at its full depth on the tap, is instantly released, and drops free of the machine. Thereupon when the tap is backed off the completed nut on the outward movement of the head 34, the nut completed takes the lower position as redefined by the reset trigger 71 and the next one of the series takes the position to be operated upon. The precise and insantaneous release effectively precludes any miscarriage of the releasing mechanism due to the irregularity of the surface of the work being operated upon.

It should be understood that the structure and mechanism shown is for the purpose of illustration only and that various other structures and mechanisms may be devised which embody the invention and which come within the spirit and scope of the appended claims.

Having described my invention what I claim and desire to secure by Letters Patent is:

1. A machine of the character described comprising a threading tool, a work holding device, mechanism for causing a cyclic approach and separation of said tool and device for operating successively upon the same or different work pieces, the work pieces being supplied seriatim into operative relation to the tool, and means for retaining a work piece in operative relation to the tool until a predetermined length of thread is attained in said work piece, whereby the tool is cyclically presented to the same or different work pieces dependent upon the length of thread attained at one presentation.

2. A machine of the character described comprising a cutting tool, a work holding device, mechanism for causing a cyclic approach and separation of said tool and work holding device to permit the tool to operate upon the work, and means for retaining a piece of work in said device in operative relation to the tool, said retaining means being operated to permit movement of said work piece from its operative relation to the tool only upon the completion of a desired depth of cut in said work piece, whereby the cutting tool is cyclically presented to the same work piece until said desired depth of cut is attained or the machine is stopped.

3. A machine of the character described comprising a thread-cutting mechanism, a work-holding mechanism adapted for yieldable relative presentation with respect to said thread-cutting mechanism whereby to enable the latter to cut threads in the work, cyclical mechanism adapted to effect periodic presentation of the work to said thread-cutting mechanism, and retaining mechanism adapted to retain the threaded work in thread-cutting position subject, for release, to the cutting of a predetermined length of thread.

4. A machine of the character described comprising a thread-cutting mechanism, a work-holding mechanism having a floating movement transversely of the axis of the thread-cutting mechanism, said work-holding mechanism having also a movement parallel to the axis of the thread-cutting mechanism, and means adapted for engagement with the work to be threaded while supported in said floating work-holding mechanism whereby to axially align said work with respect to the thread-cutting mechanism.

5. A machine of the character described comprising a thread-cutting mechanism, a work-holding mechanism having a floating movement transversely of the axis of the thread-cutting mechanism, said work-holding mechanism having a movement parallel to the axis of the thread-cutting mechanism, and means adapted for engagement with the work to be threaded while supported in said floating work-holding mechanism whereby to axially align said work with respect to the thread-cutting mechanism, said aligning means being permanently aligned with relation to the axis of the thread-cutting mechanism.

6. A machine of the character described comprising a thread-cutting mechanism provided with a fixed working axis, a work-holding mechanism mounted for relative floating movement with respect to said thread-cutting mechanism transversely of the axis of the latter, said thread-cutting mechanism and said work-holding mechanism having relative approach and separation movement, and means for aligning the work while supported in said work-holding mechanism with the axis of the thread-cutting mechanism by engagement therewith during the relative approach movement of said thread-cutting and work-holding mechanisms.

7. A machine of the character described comprising a thread-cutting mechanism having a determinate working axis and a work-holding mechanism, said mechanisms having a relative floating movement as respects each other transversely of said working axis and a work-presentation movement parallel to said axis, and a work-aligning device adapted to engage the work to be threaded while said work is supported in said work holding mechanism under a yielding pressure during said movement of presentation whereby to axially align the work upon said working axis.

8. A machine of the character described comprising a thread-cutting mechanism, a work-holding magazine in which the work is fed downwardly by gravity to the working axis of the thread-cutting mechanism, said magazine having a floating movement transversely of said working axis in the operating zone, and a work-aligning device engaging the work while supported in said magazine through a movement of relative presentation of the magazine work holder to the thread-cutting mechanism whereby to align the work for the cutting of threads therein.

9. A machine of the class described comprising a head carrying thread-cutting mechanism, a head carrying nut holding mechanism, said mechanisms being adapted to be relatively approached and separated, said nut holding mechanism embodying a flat surface for engagement with a flattened face of a nut, and aligning means permanently aligned with the axis of the thread-cutting mechanism through engagement with the head carrying said mechanism and engaging the face of the nut opposite the face engaged by said flat surface on the nut holding mechanism, and coacting therewith to clamp the nut in position with its axis aligned with the axis of the thread cutting mechanism, said aligning means being further supported and guided by the head carrying the nut holding mechanism.

10. A machine for tapping ball-faced nuts each having a flattened surface in a predetermined relation to the desired axis of the nut, comprising a thread-cutting mechanism, a nut-holding device, said nut-holding device embodying a flat surface for engagement with the flattened face of the nut, and a centering device opposed to said flat surface and having a permanent center on the working axis of the thread-cutting mechanism, said centering device having portions for engagement with the ball face of the nut to be tapped to accurately align the axis of the nut with the thread-cutting mechanism upon presentation of the nut-holding device to said thread-cutting mechanism.

11. A machine for tapping ball-faced nuts having flattened surfaces in a predetermined relation to the desired axis of the nut, comprising a thread-cutting mechanism, a nut-holding device embodying an aligning face engaging the aligning face of the nut, and a three-point centering device having a center fixed with respect to the working axis of the thread-cutting mechanism, said points being developed from the surface of a cone whereby they engage the spherical face of the nuts on a circle.

12. A machine of the character described comprising a thread-cutting mechanism, a work-holding mechanism adapted for relative movement toward and from said thread-cutting mechanism, resilient means for yieldingly presenting said work-holding mechanism toward said thread-cutting mechanism, and additional positive means for withdrawing said work-holding mechanism from said thread-cutting mechanism against the action of said resilient means.

13. A machine of the character described comprising a thread-cutting device, a work holding device, means for relatively approaching and separating said devices to present a work piece to the action of the thread-cutting device and to remove it from such action, means for retaining a work piece in operative relation to the cutting device, said means being operative to release the work piece for movement away from its operative relation to the cutting device only upon the work piece being threaded to a predetermined depth, said approach and separation means being operative to successively operate upon the same work piece until said depth is reached.

In testimony whereof I hereunto affix my signature.

GEORGE A. VIS.